July 21, 1953     C. E. DEARDORFF     2,646,025

BY-PASS VALVE FOR HYDRAULIC MOTORS

Filed Feb. 7, 1951

INVENTOR.
C. E. Deardorff
BY
ATTORNEY

Patented July 21, 1953

2,646,025

UNITED STATES PATENT OFFICE 2,646,025

BY-PASS VALVE FOR HYDRAULIC MOTORS

Clinton E. Deardorff, San Fernando, Calif., assignor to Bendix Aviation Corporation, South Bend, Ind., a corporation of Delaware Application February 7, 1951, Serial No. 209,848

8 Claims. (Cl. 121—38)

1

This invention relates to hydraulic motor circuits in which a reversible motor may tend to run faster in one direction than a pump can supply fluid thereto, and an object of the invention is to provide a satisfactory valve for bypassing fluid from the outlet to the inlet of the motor when the latter outruns its fluid supply, without interfering with the normal operation of the motor in the other direction.

Other more specific objects and features of the invention will become apparent from the description to follow with reference to the drawing.

Figure 1:
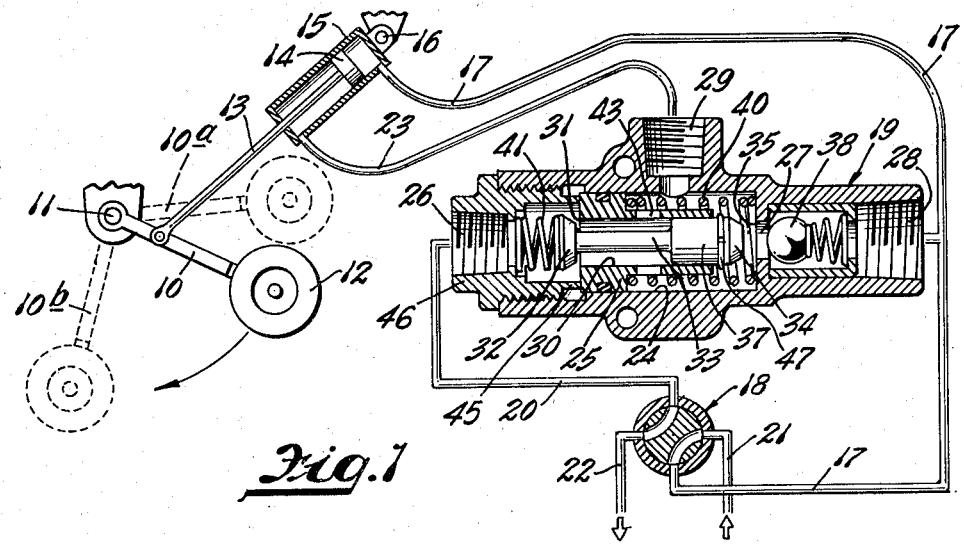
Fig. 1 is a schematic diagram of a hydraulic landing gear system incorporating a valve in accordance with the present invention, the valve being shown in longitudinal section.

In Fig. 1 there is indicated schematically a hydraulic landing gear for an airplane, the gear consisting of an arm 10 adapted to be swung about a pivot 11 from an elevated or retracted position, as indicated at 10a, into a fully lowered position 10b. A rubber tired wheel 12 is indicated on the outer end of the arm 10. To actuate the arm 10 through its range of movement, it is connected by a rod 13 to the piston 14 of a hydraulic motor cylinder 15; the latter being pivotally supported as by a pivot 16 to the frame of the airplane. The upper end of the cylinder 15 is connected directly by a duct 17 to one of the output ports of a 4-way selector valve 18. The lower end of the cylinder 15 is connected by a duct 23 to one port 29 of a valve 19 in accordance with the present invention, and another port 26 of this valve is connected by a duct 20 to the other output port of the 4-way selector valve 18. The selector valve 18 is provided with a pressure supply line 21, and an exhaust line 22.

If the valve 19 were not interposed in the system, the duct 23 would be connected directly to the duct 20, which, when the valve 18 is in the position shown in Fig. 1, is connected to exhaust whereas the other duct 17 is connected to the pressure fluid supply. This pressure fluid supply originates at a pump which usually has a limited volumetric capacity. During downward movement of the arm 10, the weight of the arm 10 and the wheel 12 is often sufficient to carry the piston 14 downwardly in the cylinder 15 faster than fluid can be supplied thereto through the duct 17 from a pump. The result is that the piston 14 draws a vacuum in the upper end of the cylinder 15 until the arm 10 is near its lower

2 position, whereupon the mechanism waits until the pump has filled the cavity in the upper end of the cylinder 15, before pressure is developed therein to complete the movement of the arm 10 into its lowermost position, as illustrated at 10b.

The purpose of the valve 19 is to permit fluid from the lower end of the cylinder 15 to be bypassed through the duct 23, the valve 19, and the duct 17 back to the upper end of the cylinder 15 when the movement of the piston 14 in response to the weight of the landing gear develops a higher pressure in the duct 23 than in the duct 17. This bypass of fluid maintains the upper end of the cylinder 15 filled with fluid at all times. Therefore, as soon as the downward movement of the piston 14, by gravity, is terminated, the pressure fluid supplied by the pump can move the piston into its full lowermost position. However, the valve 19 must prevent the bypass of fluid from the duct 23 to the duct 17, when the landing gear is being raised by admission of pressure fluid through the duct 20 and exhaust of fluid through the duct 17.

The body of the valve 19 defines a cylinder 24 containing a piston 25 reciprocable therein. The left end of the cylinder 24 is in communication with the port 26 which is connected to the duct 20, and the right end of the cylinder is connected by a passage 27 with the port 28 that is connected to the duct 17. The port 29 to which the duct 23 is connected is also in communication with the right end of the cylinder 24.

The piston 25 is hollow, having a passage 30 extending therethrough, which passage terminates at the left end of the piston in a valve seat 31 adapted to be engaged by a poppet valve 32. This poppet valve 32 is connected by a stem 33 with a second poppet valve 334 which is adapted to close against a seat 35 at the inner end of the passage 27. A head 37 on the stem 33 slideably engages the right end of the piston 25 to guide the poppets relative to the piston. The outer end of the passage 27 is normally closed by a ball check valve 38 which permits flow into the port 28 but not outwardly therethrough. The piston 25 is urged to the left by a helical compression spring 40, and the poppet 32 is urged to the right by a helical compression spring 41.

Figure 2:
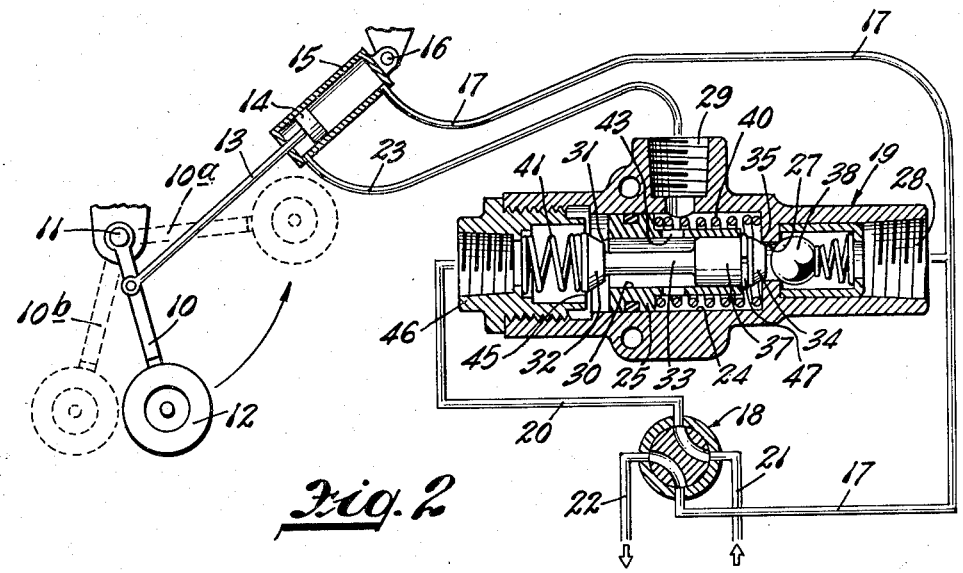
Fig. 2 is a view similar to Fig. 1 but showing the apparatus in a different phase of its operation.

The spring 41 is of sufficient length to close the poppet 34 against the seat 35 as shown in Fig. 2. The length of the stem 33 is such that with the piston 25 in its left limit position and the poppet 32 seated on seat 31, the poppet 34 is unseated from the seat 35.

It will be observed that the springs 41 and 40 are in opposing relation and that the position of the assembly consisting of the poppet 32, poppet 34 and piston 25 will be dependent upon the relative forces of these two springs, in the absence of pressure forces. The springs may be balanced so that the left end of piston 25 is away from a stop 45 constituted by the inner end of a closure plug 46 containing the port 26, and the poppet 34 is away from the seat 35. If the spring 40 is stronger, the piston 25 will normally rest against the stop 45, whereas if the spring 41 is stronger the poppet 34 will normally rest against the seat 35. The strength of the springs relative to each other is not of major importance, but they should both be light so that the position of the assembly is responsive to relatively slight pressure differentials. Thus a relatively small reversal in the differential pressure between ports 26 and 29 should shift the valve between the two positions shown in Figs. 1 and 2 respectively. In practice it may be desirable to make spring 40 slightly stronger than spring 41 so that poppet 34 is open in the absence of pressure forces.

The head 37 has mounted in an annular groove thereon a snap ring 47 which is engageable with the right end of the piston 25 to limit leftward movement of the head 37 relative to the piston 25, as shown in Fig. 2.

The system functions as follows. Consider first Fig. 1, in which the selector valve 18 is adjusted to connect the duct 17 to the pressure supply line 21, and the duct 20 to the exhaust line 22. At this time, the weight of the landing gear is urging the piston 14 downwardly and tends to move the piston faster than fluid is supplied to the upper end of the cylinder by the pump through the selector valve 18. This produces a pressure in the duct 23 that is higher than that in the duct 17, with the result that the fluid flows from the lower end of the cylinder 15 through the duct 23 into the port 29 of the valve 19, and thence through the passage 27 past the check valve 38 and through the port 28 to the duct 17, where it mixes with the fluid being supplied by the pump through the pressure line 21, and flows on into the upper end of the cylinder 15. Poppet 34 is unseated at this time because the pressure in port 29 is higher than that in port 26, creating a pressure differential across piston 25 holding the latter against the stop 45.

Since some fluid is being supplied through the pressure supply line 21, the total amount of fluid flowing through the duct 17 into the upper end of the cylinder 15 will increase the pressure in the duct 23 above that in the duct 20. When this pressure develops a force against the poppet 34 sufficient to overcome the force of the spring 41, the assembly consisting of the poppets 34 and 32 is moved to the left permitting the excess fluid entering the port 29 to flow through ports 43 in the piston 25, into the center space in the piston and thence past the poppet 32 and out through the port 26 to the duct 20. The overall result is that sufficient fluid is bypassed through the valve from port 29 to port 28 to make up the deficiency in the upper end of the cylinder 15 resulting from the fact that the piston 14 is creating space in the upper end of the cylinder faster than the pump can supply it, and the excess fluid equal to that being supplied by the pump through the pressure line 21 is permitted to escape past the poppet 32 into the duct 20 and thence back to the exhaust line 22.

The landing gear shown in Fig. 1, and as usually constructed, is of such nature that it is incapable of moving into its full lowermost position by gravity. At some point near the lower limit of movement of the piston 14, the mechanism has to be moved by pressure fluid in the upper end of the cylinder 15. Hence when the piston 14 begins to offer resistance to the downward movement, the pressure rises in the upper end of the cylinder 15 and in the duct 17. This increase in pressure prevents opening of the check valve 38, so that thereafter all of the fluid exhausted through the duct 23 escapes past the poppet 32 into the duct 20 and thence back to the exhaust line 22.

Referring now to Fig. 2, when the landing gear is to be retracted, the selector valve 18 is rotated through a quarter turn to connect the pressure supply line 21 to the duct 20, and connect the exhaust line 22 to the duct 17. The pressure fluid in duct 20 enters the port 26 and is applied against the left end of the piston 25 and the poppet 32, tending to move them as a unit to the right. The piston and the poppet do move as a unit to the right until the poppet 34 seats against the seat 35. Thereafter the piston 25 moves alone carrying the seat 31 away from the poppet 32. This opens a passage for the flow of pressure fluid from the duct 20 through the port 26, past the valve seat 31 into the hollow piston, and thence through the passages 43 to the port 29 and through the duct 23 connected thereto, to the lower end of the cylinder 15. As the piston 14 is moved upwardly by the flow of pressure fluid into the cylinder therebelow, fluid in the upper end of the cylinder is exhausted through the duct 17 and the valve 18 to the exhaust line 22. At this time the passage 27 connecting the cylinder 24 with the port 28 is blocked against flow of liquid in either direction, the poppet 34 blocking flow out of the cylinder 24, and the check valve 38 blocking flow into the cylinder.

It will be observed, therefore, that the valve functions to bypass fluid from the port 29 to the port 28 when the pressure in port 29 exceeds that in port 28, and there is no pressure existent in the port 26. On the other hand, when pressure fluid is present in the port 26, the bypass action of the valve is disabled, and there can be no transfer of pressure fluid either from the port 26 or the port 29 to the port 28.

The seat 31 on the piston 25 remains unseated from the poppet 32 only while there is flow of fluid into the port 26 and past the seat 31 to produce a pressure drop across the seat. When flow ceases, the pressure forces on the piston 25 are balanced and the piston is moved to the left back into engagement with the poppet 32 by the spring 40. However, as long as the pressure in the port 26 is higher than that in the port 28, the pressure forces on the assembly comprising the poppet 32, the stem 33 and the poppet 34 will be unbalanced and the assembly will be retained in its rightmost position as shown in Fig. 2, with the poppet 34 sealing against the seat 35.

Although for the purpose of explaining the invention a particular embodiment thereof has been shown and described, obvious modifications will occur to a person skilled in the art, and I do not desire to be limited to the exact details shown and described.

I claim:

1. A valve for use with a reversible hydraulic motor having a pair of ducts and means for simultaneously connecting either duct to a source of pressure fluid and the other duct to exhaust, said valve comprising: a valve body having first and second ports adapted to be connected in series in one of said ducts with said second port nearest the motor, and a third port adapted to be connected to the other of said ducts; said body defining a passage interconnecting said first and second ports; first valve means in said passage comprising a pair of cooperating valve elements both movable in said passage and movable relative to each other between open and closed positions; first spring means urging one element away from said first port and in valve closing direction with respect to the other element; second spring means urging the other valve element toward said first port and in valve closing direction with respect to said one element; said valve elements having pressure faces responsive to differential pressures between said first and second ports to open said first valve means in response to a pressure differential of predetermined magnitude between said first and second ports in either direction; second normally closed valve means between said second and third ports, and means responsive to pressure in said second port exceeding the pressures in both said said first and third ports for opening said second valve means.

2. A valve according to claim 1 in which one of said valve elements comprises a piston member in said passage, said piston member having a passage therethrough, and the other of said valve elements comprises a closure member movable into and out of closing relation with said passage in said piston member.

3. A valve according to claim 1 in which said second valve means comprises a valve seat in communication with said third port, a poppet therefor, and means connecting said poppet to said first valve means for opening said poppet off said seat in response to movement of said first valve means toward said first port.

4. A valve according to claim 3 in which said second valve means includes a check valve between said valve seat and said third port for permitting flow through said third port into said valve and preventing reverse flow.

5. In combination, a reversible hydraulic motor having a pair of ducts; a selector valve having a pair of motor ports; a bypass valve comprising a valve body having first and second ports connected in series between one motor duct and one motor port of said selector valve with said second port nearest the motor, said valve body having a third port connected to the other motor duct and the other motor port of said selector valve in parallel; said valve body defining a passage interconnecting said first and second ports; the first valve means in said passage comprising a pair of cooperating valve elements both movable in said passage and movable relative to each other between open and closed positions; first spring means urging one element away from said first port and in valve closing direction with respect to the other element; second spring means urging the other valve element toward said first port and in valve closing direction with respect to said one element; said valve elements having pressure faces responsive to differential pressures between said first and second ports to open said first valve means in response to a pressure differential of predetermined magnitude between said first and second ports in either direction; second normally closed valve means between said second and third ports, and means responsive to pressure in said second port exceeding the pressures in both said first and third ports for opening said second valve means.

6. A valve for use with a reversible hydraulic motor having a pair of ducts and means for simultaneously connecting either duct to a source of pressure fluid and the other duct to exhaust, said valve comprising: a valve body having first and second ports adapted to be connected in series in one of said ducts with said second port nearest the motor, and a third port adapted to be connected to the other of said ducts; said body defining a passage interconnecting said first and second ports; first valve means in said passage comprising a first movable valve seat reciprocable in said body and interconnecting said first and second ports; a first poppet for said first seat on the first port side thereof independently reciprocable in said body toward and away from said first seat; spring means urging said first seat and said first poppet toward seating relation with each other; a second stationary valve seat interconnecting said second and third ports, and a second poppet for said stationary seat on the second port side thereof; a stop limiting movement of said first seat toward said first port; means interconnecting said first and second poppets for movement in unison and in such spaced relation that movement of said first seat against said stop unseats said second poppet; whereby pressure in the first port exceeding pressure in the second port seats said second poppet and unseats the first seat from the first poppet, and pressure in the second port exceeding the pressure in the first port unseats both poppets; and a check valve for preventing flow from said third port to said second seat.

7. A valve according to claim 6 in which said spring means comprises two separate springs one between said body and said poppets and urging them toward their seats and the other between said body and said movable seat and urging it toward said first seat and said stop.

8. A valve according to claim 7 in which said other spring is stronger than said one spring whereby it unseats said second poppet in the absence of pressure forces aiding the one spring.

CLINTON E. DEARDORFF.

References Cited in the file of this patent
UNITED STATES PATENTS

| Number | Name | Date |
|---|---|---|
| 2,267,284 | Livers | Dec. 23, 1941 |
| 2,367,682 | Kehle | Jan. 23, 1945 |